US008681513B2

(12) United States Patent
Reddy

(10) Patent No.: US 8,681,513 B2
(45) Date of Patent: Mar. 25, 2014

(54) OPTIMIZATION OF A POWER CONVERTER EMPLOYING AN LLC CONVERTER

(75) Inventor: Raghothama Reddy, Murphy, TX (US)

(73) Assignee: General Electric Company, Schenectady, NY (US)

( * ) Notice: Subject to any disclaimer, the term of this patent is extended or adjusted under 35 U.S.C. 154(b) by 387 days.

(21) Appl. No.: 13/170,614

(22) Filed: Jun. 28, 2011

(65) Prior Publication Data

US 2013/0003430 A1    Jan. 3, 2013

(51) Int. Cl.
*H02M 3/335*    (2006.01)
*H02M 7/217*    (2006.01)

(52) U.S. Cl.
USPC ........................ 363/21.02; 323/266

(58) Field of Classification Search
USPC ......... 363/21.02, 21.03, 16, 17, 89, 125, 127; 323/266, 271
See application file for complete search history.

(56) References Cited

U.S. PATENT DOCUMENTS

| | | | |
|---|---|---|---|
| 4,533,986 A * | 8/1985 | Jones | 363/17 |
| 4,814,685 A * | 3/1989 | Renger | 323/224 |
| 6,437,994 B1 | 8/2002 | Blom et al. | |
| 6,850,044 B2 * | 2/2005 | Hansen et al. | 323/266 |
| 7,324,354 B2 * | 1/2008 | Joshi et al. | 363/17 |
| 7,952,892 B2 | 5/2011 | Orr | |
| 8,018,740 B2 | 9/2011 | Sun et al. | |
| 8,330,389 B2 | 12/2012 | Adragna | |
| 8,467,199 B2 * | 6/2013 | Lee et al. | 363/21.02 |
| 2008/0198638 A1 * | 8/2008 | Reinberger et al. | 363/74 |
| 2011/0310640 A1 | 12/2011 | Tao | |
| 2012/0112657 A1 | 5/2012 | Van Der Veen et al. | |
| 2012/0153730 A1 | 6/2012 | Barnett et al. | |
| 2013/0021827 A1 | 1/2013 | Ye | |

* cited by examiner

*Primary Examiner* — Gary L Laxton
(74) *Attorney, Agent, or Firm* — General Electric Company

(57) ABSTRACT

A power converter includes an input stage connected to receive an input signal and to provide an intermediate DC voltage, and an output stage having an LLC converter connected to receive the intermediate DC voltage and to provide a DC output voltage. Additionally, the power converter includes a control unit connected to the input and output stages to regulate the DC output voltage and set a target operating parameter of the LLC converter based on controlling the intermediate DC voltage. A method of operating a power converter is also provided.

16 Claims, 5 Drawing Sheets

US 8,681,513 B2

OPTIMIZATION OF A POWER CONVERTER EMPLOYING AN LLC CONVERTER

TECHNICAL FIELD

This application is directed, in general, to power conversion and, more specifically, to a power converter and a method of operating a power converter.

BACKGROUND

Inductor-inductor-capacitor (LLC) power converters are an increasingly important part of power conversion systems. LLC power converters have a number of advantages when compared to other power converters. These advantages may include zero voltage switching when cycling between a no-load to a full load on primary switches along with providing lower electromagnetic emissions. LLC power converters may also operate at higher switching frequencies than many other forms of power converters, which can in turn decrease the size of some LLC power converter components. However, disadvantages also arise when employing LLC power converters, which include component tolerance variations in tank elements of the LLC converter from unit to unit thereby providing different series resonant gain curves and corresponding differences in converter output voltage. Additionally, unit to unit variations in an input voltage to the LLC converter also provide DC output voltage variations. Improvements in these areas would prove beneficial to the art.

SUMMARY

Embodiments of the present disclosure provide a power converter and a method of operating a power converter. In one embodiment, the power converter includes an input stage connected to receive an input signal and to provide an intermediate DC voltage and an output stage having an LLC converter connected to receive the intermediate DC voltage and to provide a DC output voltage. Additionally, the power converter includes a control unit connected to the input and output stages to regulate the DC output voltage and set a target operating parameter of the LLC converter based on controlling the intermediate DC voltage.

In another aspect, the method of operating a power converter includes receiving an input signal and providing an intermediate DC voltage and generating a DC output voltage from an LLC converter having an input coupled to the intermediate DC voltage. The method also includes regulating the DC output voltage and setting a target operating parameter of the LLC converter based on controlling the intermediate DC voltage.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION

Reference is now made to the following descriptions taken in conjunction with the accompanying drawings, in which.

DETAILED DESCRIPTION

Embodiments of the present disclosure employ control units that provide total closed loop control of input and output power converter stages to allow amelioration of several operational problems. These operational problems include unit-to-unit component tolerance variations in tank elements of LLC converters that would provide different series resonant gain curves and affect a DC output voltage. Additionally, unit to unit variations in an intermediate DC voltage would provide variations in the DC output voltage, if not counterbalanced.

Figure 1:
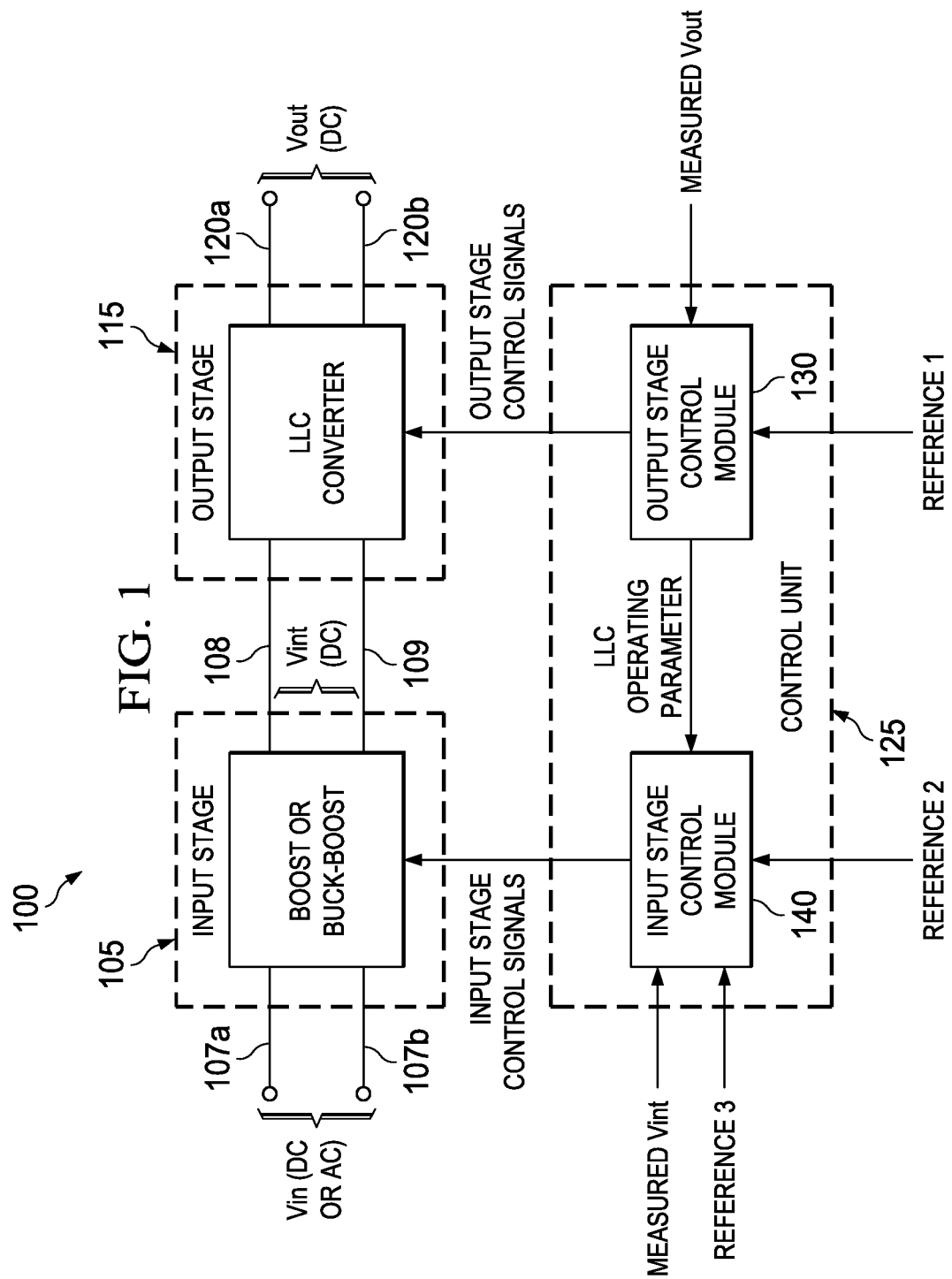
FIG. 1 illustrates a block diagram of a power converter constructed according to the principles of the present disclosure.

FIG. 1 illustrates a block diagram of a power converter, generally designated 100, constructed according to the principles of the present disclosure. The power converter 100 includes an input stage 105, an output stage 115 and a control unit 125.

The input stage 105 includes a boost or buck-boost power converter, for example, having representative inputs 107a, 107b connected to an input voltage Vin that may be a DC voltage, a single phase AC voltage or a three phase AC voltage, as required. The input stage 105 also includes an output having two levels 108, 109 connected to provide an intermediate DC voltage Vint. The boost or buck-boost power converter is a PFC (power factor correction) structure having conventional voltage and current controllers wherein the conventional current controller is further coupled to the control unit 125.

The output stage 115 includes an inductor-inductor-capacitor (LLC) converter having inputs coupled to the intermediate DC voltage Vint and LLC outputs 120a, 120b that provide a DC output voltage Vout and accommodate an output load (not specifically shown). The LLC converter may be a half-bridge or a full-bridge LLC converter having conventional control switching that is coupled to the control unit 125.

The control unit 125 includes an output stage control module 130 and an input stage control module 140. The output stage control module 130 is connected to the DC output voltage Vout to provide an input corresponding to the DC output voltage Vout (i.e., a measured Vout). The output stage control module 130 also employs a first reference (Reference 1) to provide output stage control signals for the LLC converter and an LLC operating parameter (e.g., an operating frequency or period) to the input stage control module 140. The output stage control signals for the LLC converter may be applied to input and transformer control switches of the LLC converter in a conventional manner.

The input stage control module 140 employs second and third references (Reference 2 and Reference 3) along with the LLC operating parameter and an input corresponding to the measured intermediate DC voltage Vint (measured Vint) to provide input stage control signals to the boost or buck-boost power converter of the input stage 105. The input stage control signals for the boost or buck-boost power converter may be applied to its conventional current controller.

Figure 2:
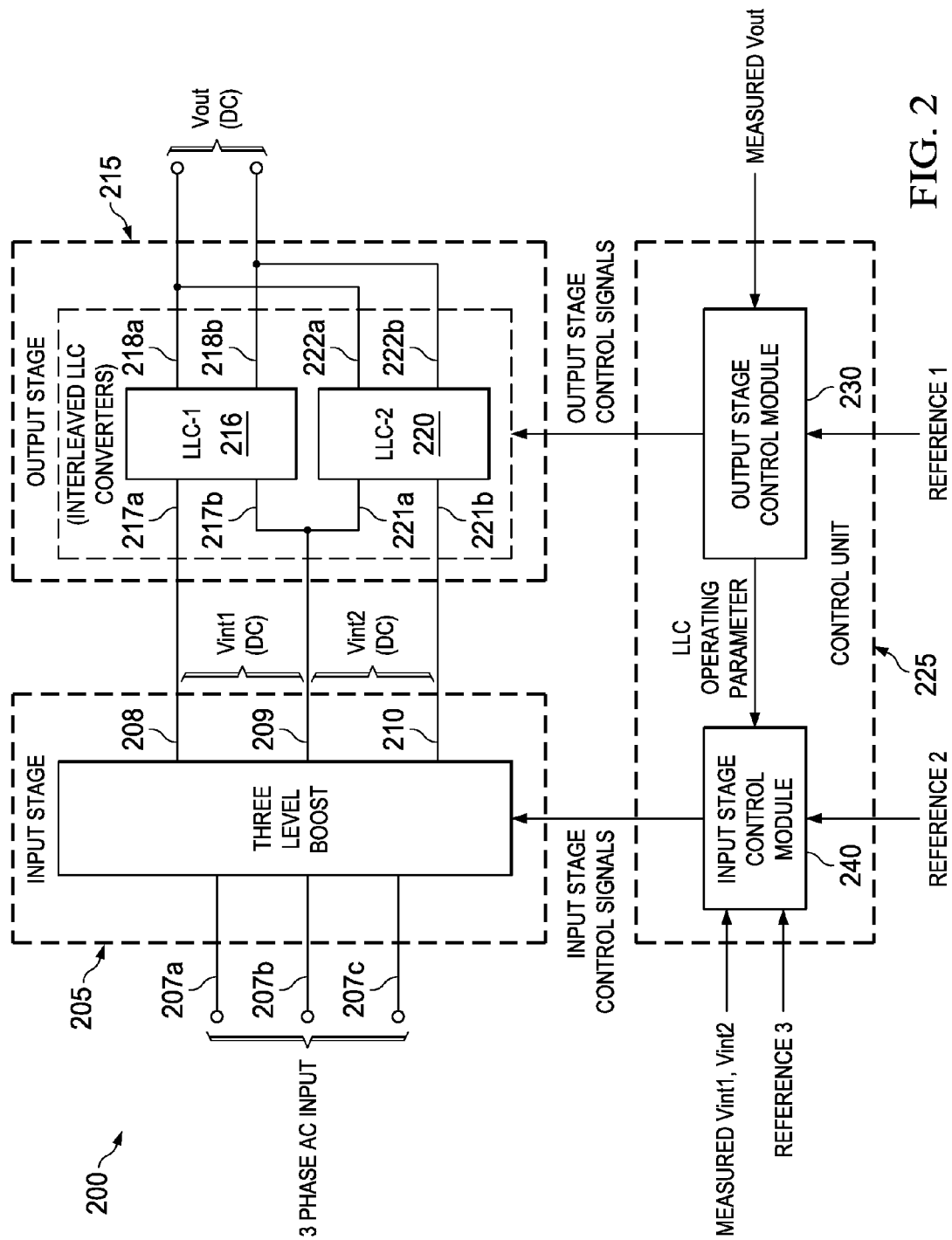
FIG. 2 illustrates a block diagram of another power converter constructed according to the principles of the present disclosure.

FIG. 2 illustrates a block diagram of another power converter, generally designated 200, constructed according to the principles of the present disclosure. The power converter 200 includes an input stage 205, an output stage 215 and a control unit 225.

In this embodiment, the input stage 205 is a three phase, three level boost PFC power converter and includes three inputs 207a, 207b, 207c connected to three phase AC input voltages Va, Vb, Vc. The input stage 205 also includes an output having three levels 208, 209, 210 connected to provide first and second intermediate DC voltages Vint1, Vint2, as shown. The input stage 205 employs conventional current and voltage controllers wherein the conventional current controller is further coupled to the control unit 225.

The output stage 215 includes first and second interleaved LLC converters 216, 220 having first and second series-connected inputs 217a, 217b, and 221a, 221b that are coupled to the first and second intermediate DC voltages Vint1, Vint2, as shown. First and second parallel-connected outputs 218a, 222a and 218b, 222b provide a DC output voltage Vout and accommodate an output load. The first and second interleaved LLC converters 216, 220 may be half-bridge or full-bridge LLC converters having conventional control switching that is coupled to the control unit 225.

The control unit 225 parallels the operation of the control unit 125 and includes an output stage control module 230 and an input stage control module 240. The output stage control module 230 is connected to the DC output voltage Vout to provide an input corresponding to the DC output voltage Vout (i.e., a measured Vout), as before. The output stage control module 230 also employs a first reference (Reference 1) to provide output stage control signals for the first and second LLC converters 216, 220 and an LLC operating parameter (e.g., an operating frequency or period) to the input stage control module 240. The output stage control signals for the interleaved LLC converters may be applied to input and transformer control switches of the LLC converters in a conventional manner.

The input stage control module 240 employs second and third references (Reference 2 and Reference 3) along with the LLC operating parameter and an input corresponding to the first and second intermediate DC voltages Vint1, Vint2 (i.e., a measured Vint1, Vint2) to provide input stage control signals to the three phase, three level boost power converter of the input stage 205. The input stage control signals for the three level boost converter may be applied to its conventional current controller.

Figure 3:
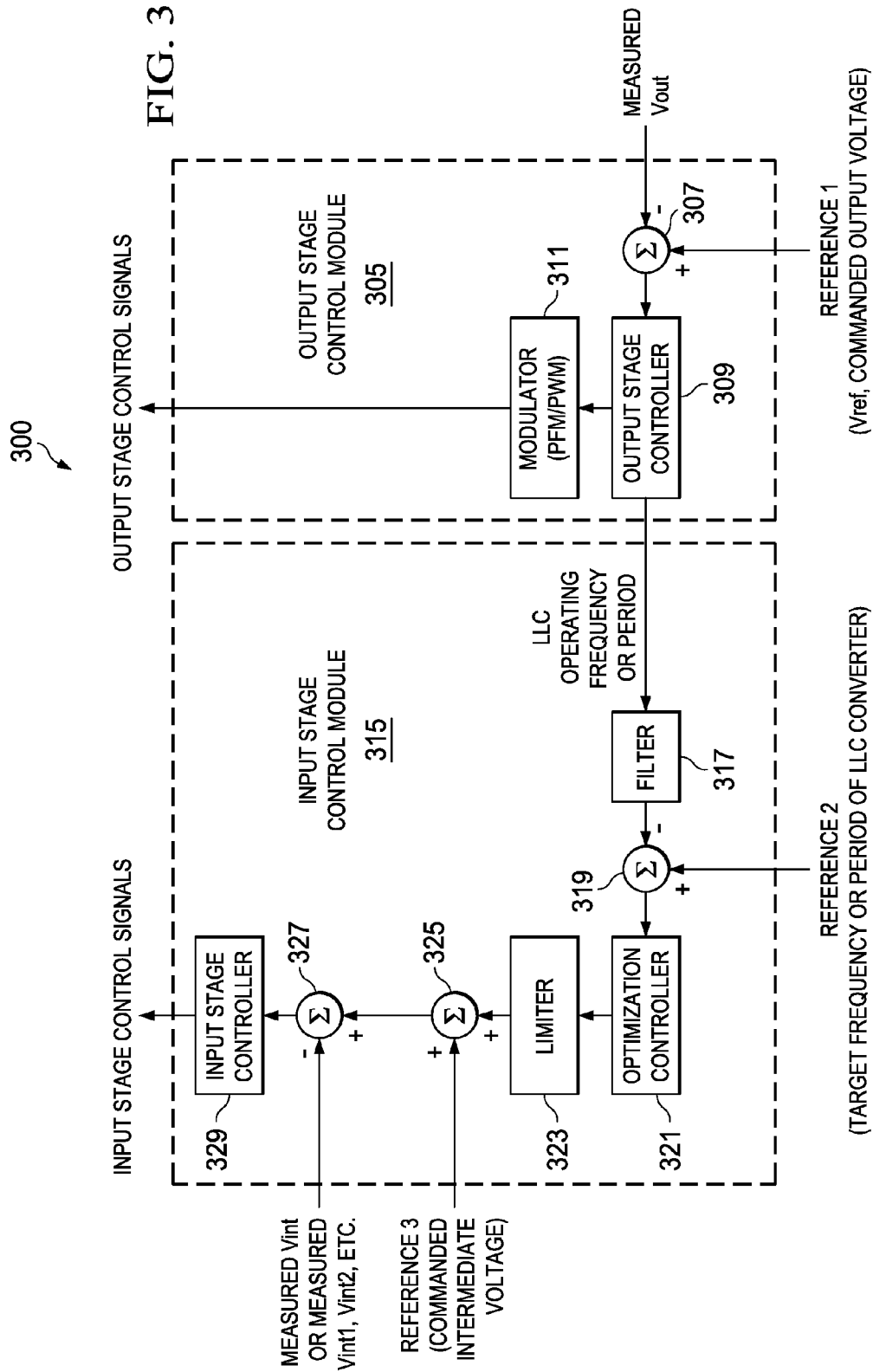
FIG. 3 illustrates an expanded block diagram of an embodiment of a control unit as may be employed with the power converters of FIG. 1 or 2.

FIG. 3 illustrates an expanded block diagram of an embodiment of a control unit, generally designated 300, as may be employed with the power converters of FIG. 1 or 2. The control unit 300 includes an output stage control module 305 and an input stage control module 315.

The goal of the output stage control module 305 is to regulate a DC output voltage Vout corresponding to a commanded DC output voltage value required from an output stage. The commanded DC output voltage is provided by a first reference (reference 1) as a reference voltage Vref, in the illustrated embodiment. A summation element 307 compares a measured DC output voltage Vout to the commanded DC output voltage Vout to provide an output stage error signal to an output stage controller 309. The output stage controller 309 may be a PI (proportional integral) controller and provides an output controller digital output signal proportional to the output stage error signal.

A modulator 311 receives the digital output signal from the output stage controller 309 and provides output stage control signals to an LLC output stage supplying the DC output voltage Vout based on the output stage error signal. The output stage control signals may employ PFM (pulse frequency modulation) or PWM (pulse width modulation) that allows the output stage control module 305 to drive the output stage error signal to substantially zero and maintain the DC output voltage Vout to a value selected by the reference voltage Vref.

Generally, the input stage control module 315 controls and regulates an intermediate DC voltage Vint from a corresponding input stage that is applied as an input voltage to the output stage. It may regulate a single intermediate DC voltage (e.g., the intermediate DC voltage Vint of FIG. 1) or it may regulate two or more intermediate DC voltages (e.g., the first and second intermediate DC voltages Vint1, Vint2 of FIG. 2).

In the illustrated embodiment, the output stage controller 309 provides a representation of the LLC output stage operating frequency or period to a filter 317 that further provides a filtered representation of this signal to one input of a summation element 319. A target resonant frequency or period of the LLC output stage is supplied as reference 2 to the other input of the summation element 319 that further provides a first input stage error signal to an optimization controller 321. The filtered representation and its corresponding reference 2 signal may correspond to a portion of the frequency or period to enhance measurement resolution.

The optimization controller 321 may also be a PI controller that provides an optimization controller digital output signal proportional to the first input stage error signal. A limiter 323 constrains the range of adjustment allowed by the optimization controller digital output signal, to prevent overall control overload or clipping.

In one embodiment, the goal of a reference 3 is to provide a nominal set point for a single intermediate DC voltage (as seen in FIG. 1). A summation element 325 provides a second input stage error signal that corresponds to the reference 3 being modulated by the optimization controller 321 to provide an optimization range for a nominal intermediate DC voltage Vint. This optimization range corresponds to a window of operating or target frequencies between minimum and maximum series resonant frequencies.

In another embodiment, the reference 3 corresponds to an average or a summation of two or more intermediate DC voltages (e.g., the first and second intermediate DC voltages Vint1, Vint2 of FIG. 2). For this embodiment, the summation element 325 provides a second input stage error signal that corresponds to the reference 3 being modulated by the optimization controller 321 to provide an optimization window or range around nominal values of the two or more intermediate DC voltages.

A summation element 327 receives the second input stage error signal and a measured intermediate DC voltage to provide a third input stage error signal for an input stage controller 329. The measured intermediate DC voltage may correspond to a single intermediate DC voltage or two or more intermediate DC voltages, as required. The input stage controller 329 provides at least one input stage control signal to regulate one or more intermediate DC voltages corresponding to output stage LLC converter requirements.

Figure 4:
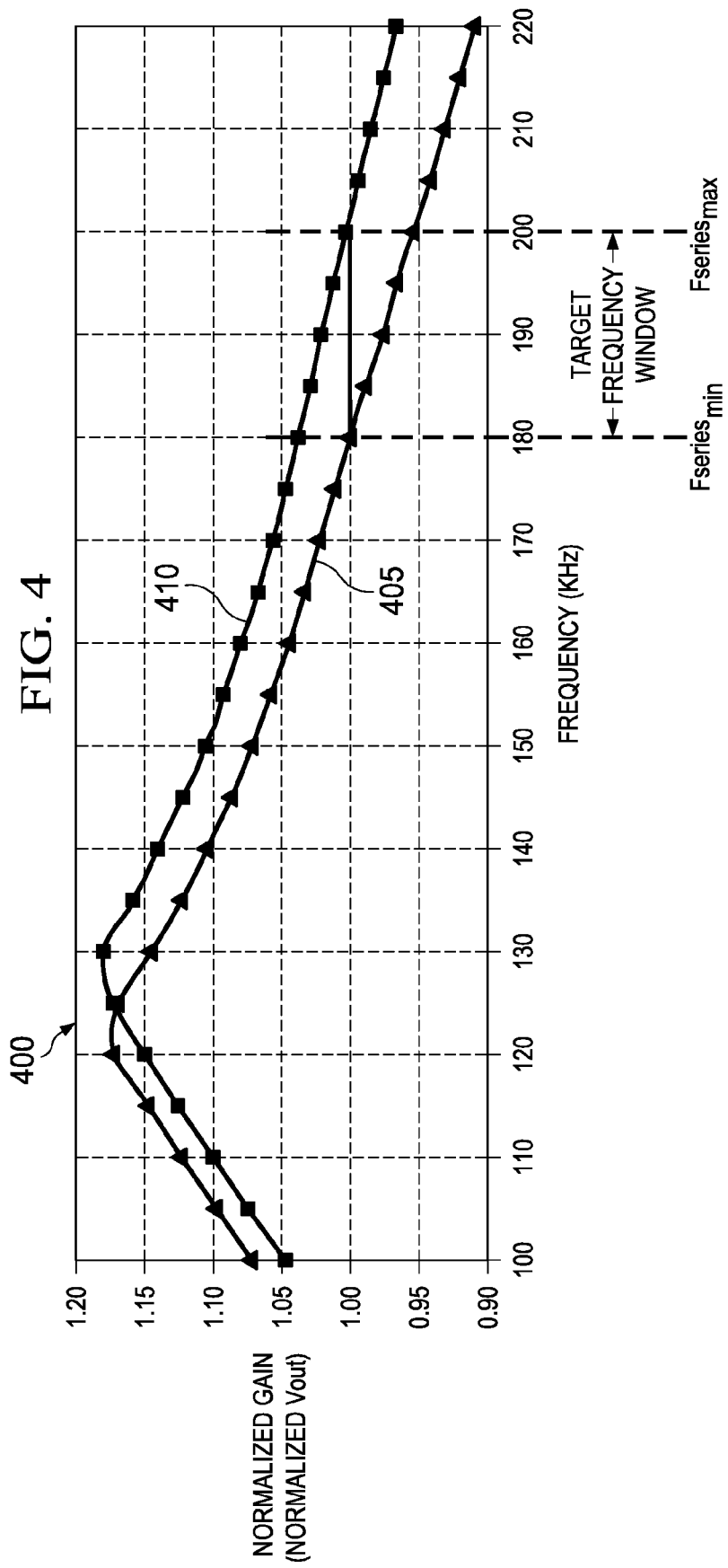
FIG. 4 illustrates normalized gain curves corresponding to LLC converters as may be employed in an output stage constructed according to principles of the present disclosure.

FIG. 4 illustrates normalized gain curves, generally designated 400, corresponding to LLC converters as may be employed in an output stage constructed according to principles of the present disclosure. The normalized gain curves 400 correspond to normalized DC output voltages and include first and second normalized gain curves 405, 410, which may correspond to a component tolerance spread of input capacitors and inductors that determine series resonance frequencies for a group of LLC converters (employed as output stages of embodiments of the present disclosure). The component tolerance spread may correspond to a single LLC converter as depicted in FIG. 1 or interleaved LLC converters as depicted in FIG. 2. Additionally, the first and second normalized gain curves 405, 410 may correspond to different values of intermediate DC voltages, or a combination of component tolerances and different intermediate DC voltages.

Minimum and maximum series resonant frequencies for worst case component mismatches in a group of LLC converters may be calculated as shown below.

$$Fseries_{min} = \frac{1}{2\pi\sqrt{L_{max}C_{max}}}, \text{ and} \quad (1a)$$

$$Fseries_{max} = \frac{1}{2\pi\sqrt{L_{min}C_{min}}} \quad (1b)$$

where $L_{max}$ and $C_{max}$ correspond to maximum input inductance and capacitance values, and $L_{min}$ and $C_{min}$ correspond to minimum input inductance and capacitance values for the group of LLC converters. Examples of these minimum and maximum series resonant frequencies are shown in FIG. 4 corresponding to 180 and 200 KHz, respectively. Series resonant frequencies for the remainder of the group of LLC converters lie between these minimum and maximum series resonant frequencies. A normalized unity gain value (i.e., a normalized gain of one) may be considered representative of a regulated commanded DC output voltage.

Figure 5:
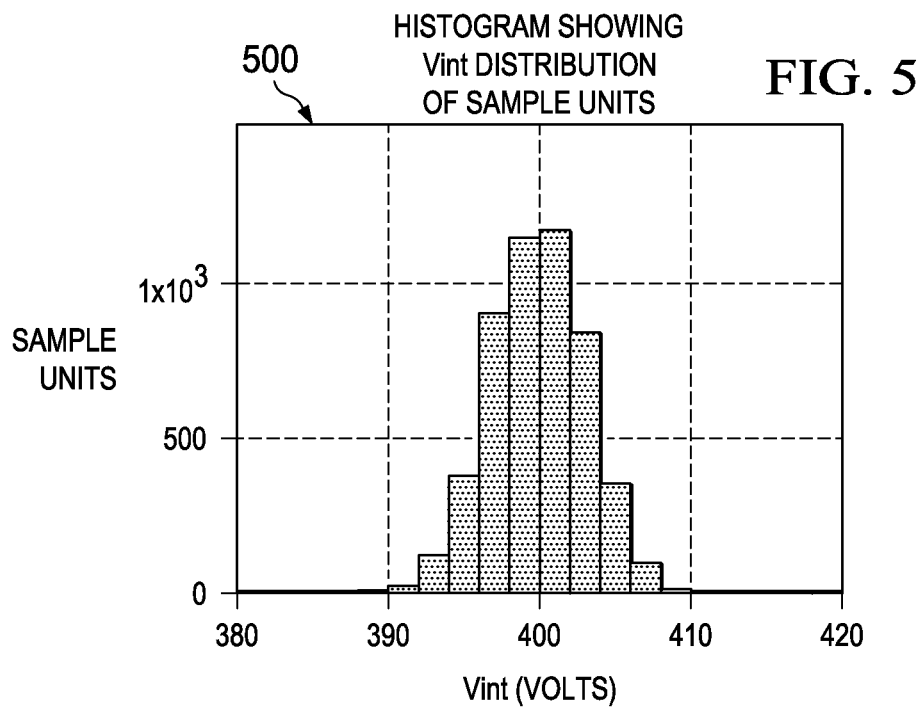
FIG. 5 illustrates an example of a histogram showing a distribution of intermediate DC voltages corresponding to the input stages of FIGS. 1 and 2.

FIG. 5 illustrates an example of a histogram showing a distribution of intermediate DC voltages, generally designated 500, corresponding to the input stages of FIGS. 1 and 2. The histogram 500 shows that the intermediate DC voltage Vint may vary between about 390 volts and 410 volts for the distribution of samples shown. This tolerance range of intermediate DC voltages would greatly impact the DC output voltage Vout without the control provided by the input stage control module 315.

At series resonance frequency, the losses for an LLC converter are minimized, and the operating efficiency of the LLC converter is maximized. Therefore, setting the target frequency (reference 2) near the series resonant frequency of a particular LLC converter allows it to maximize its operating efficiency.

In one embodiment of the present disclosure, a target frequency (reference 2) is individually selected for each LLC converter near its series resonant frequency thereby allowing it to maximize its operating efficiency. Here, the input stage control module 315 adjusts its corresponding intermediate DC voltage Vint (thereby raising the first normalized gain curve 405, for example) until it coincides with the normalized unity gain value at the series resonant frequency (i.e., target frequency) of the LLC converter. This requires that the maximum series resonant frequency also correspond to an intermediate DC voltage Vint of about 390 volts, as a worst case intermediate DC voltage.

In another embodiment of the present disclosure, a single target frequency (reference 2) is selected for all LLC converters thereby requiring each LLC converter to operate at this target frequency. Here, the target frequency may be set to the maximum series resonant frequency, since operating an LLC converter below its series resonant frequency typically provides too great a penalty to its operating efficiency. In this embodiment, operating efficiency of most of the LLC converters may be reduced somewhat, since all but one are constrained to operate above their series resonance frequency. However, this approach may be acceptable or warranted for many applications.

Here, the input stage control module 315 adjusts the intermediate DC voltage Vint (thereby raising the first normalized gain curve 405) until it coincides with the normalized unity gain value at the maximum series resonant frequency as a target frequency for all LLC converters. This also requires that the maximum series resonant frequency correspond to an intermediate DC voltage Vint of about 390 volts, as a worst case intermediate DC voltage.

Figure 6:
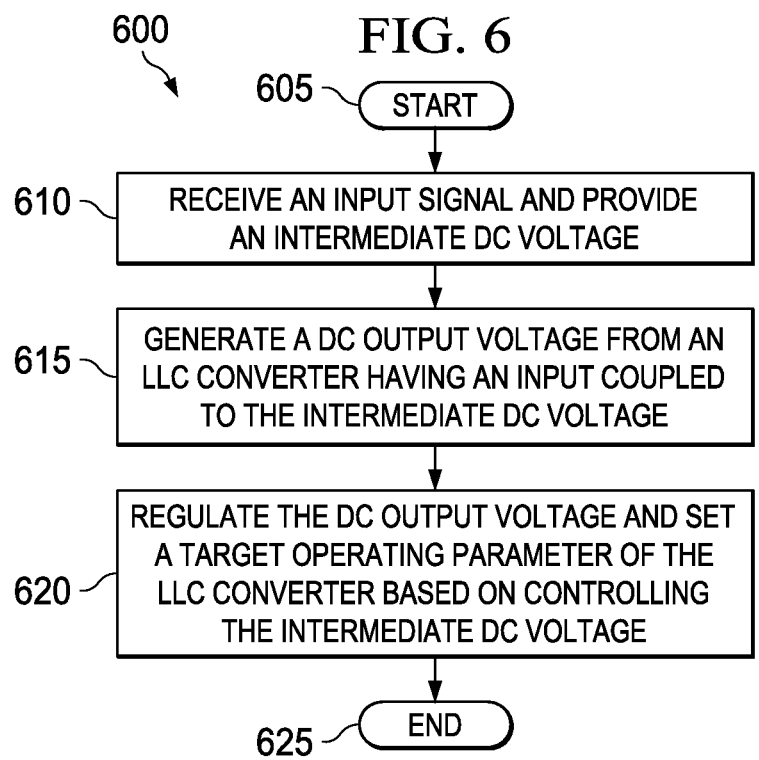
FIG. 6 illustrates a flow diagram of an embodiment of a method of operating a power converter carried out according to the principles of the present disclosure.

FIG. 6 illustrates a flow diagram of an embodiment of a method of operating a power converter, generally designated 600, carried out according to the principles of the present disclosure. The method 600 starts in a step 605 and then, in a step 610, an input signal is received and an intermediate DC voltage is provided. A DC output voltage is generated from an LLC converter having an input coupled to the intermediate DC voltage, in a step 615. The DC output voltage is regulated and a target operating parameter of the LLC converter is set based on controlling the intermediate DC voltage, in a step 620.

In one embodiment, the DC output voltage is regulated by a pulse frequency modulation (PFM) signal or a pulse width modulation (PWM) signal applied to the LLC converter. In another embodiment, the target operating parameter determines an operating frequency or an operating period of the LLC converter.

In yet another embodiment, the target operating parameter corresponds to a series resonant frequency of the LLC converter. Alternatively, the target operating parameter corresponds to a higher operating frequency of the LLC converter than its series resonant frequency and may correspond to a maximum series operating frequency selected from a group of LLC converters.

In still another embodiment, a minimum series resonance frequency determined by an upper component tolerance of an LLC converter corresponds to a lower end of a target frequency window of LLC operating frequencies. Alternatively, a maximum series resonance frequency determined by a lower component tolerance of an LLC converter corresponds to an upper end of a target frequency window of LLC operating frequencies.

In still yet another embodiment, a minimum value of the intermediate DC voltage based on a tolerance distribution of sample units is sufficient to provide a maximum series resonant frequency of the LLC converter. Correspondingly, the tolerance distribution of sample units provides a range of about five percent for the intermediate DC voltage. The method 600 ends in a step 625.

While the method disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which this application relates will appreciate that other and further additions, deletions, substitutions and modifications may be made to the described embodiments.

The invention claimed is:

1. A power converter, comprising:
an input stage connected to receive an input signal and to provide an intermediate DC voltage;
an output stage having an inductor-inductor-capacitor (LLC) converter connected to receive the intermediate DC voltage and to provide a DC output voltage; and
a control unit connected to the input and output stages to regulate the DC output voltage and set a target operating parameter of the LLC converter to control the intermediate DC voltage, wherein the target operating parameter determines an operating frequency or an operating period of the LLC converter and corresponds to a series resonant frequency of the LLC converter.

2. The power converter as recited in claim 1 wherein the DC output voltage is regulated by a pulse frequency modulation (PFM) signal or a pulse width modulation (PWM) signal applied to the LLC converter.

3. The power converter as recited in claim 1 wherein the target operating parameter corresponds to a higher operating frequency of the LLC converter than a series resonant frequency of the LLC converter.

4. The power converter as recited in claim 3 wherein the higher operating frequency of the LLC converter corresponds to a maximum series operating frequency selected from a group of LLC converters.

5. The power converter as recited in claim 1 wherein a minimum series resonance frequency determined by an upper component tolerance of an LLC converter selected from a group of LLC converters that corresponds to a lower end of a target frequency window of LLC operating frequencies.

6. The power converter as recited in claim 1 wherein a maximum series resonance frequency determined by a lower component tolerance of an LLC converter selected from a group of LLC converters that corresponds to an upper end of a target frequency window of LLC operating frequencies.

7. The power converter as recited in claim 1 wherein a minimum value of the controlled intermediate DC voltage based on a predetermined tolerance distribution histogram of sample LLC converters provides a maximum series resonant frequency of the LLC converter.

8. The power converter as recited in claim 7 wherein the predetermined tolerance distribution histogram of sample LLC converters provides a tolerance range for the controlled intermediate DC voltage of about five percent.

9. A method of operating a power converter, comprising:
receiving an input signal and providing an intermediate DC voltage;
generating a DC output voltage from an inductor-inductor-capacitor (LLC) converter having an input coupled to the intermediate DC voltage; and
regulating the DC output voltage and setting a target operating parameter of the LLC converter to control the intermediate DC voltage, wherein the target operating parameter determines an operating frequency or an operating period of the LLC converter and corresponds to a series resonant frequency of the LLC converter.

10. The method as recited in claim 9 wherein the DC output voltage is regulated by a pulse frequency modulation (PFM) signal or a pulse width modulation (PWM) signal applied to the LLC converter.

11. The method as recited in Claim 9 wherein the target operating parameter corresponds to a higher operating frequency of the LLC converter than a series resonant frequency of the LLC converter.

12. The method as recited in claim 11 wherein the higher operating frequency of the LLC converter corresponds to a maximum series operating frequency selected from a group of LLC converters.

13. The method as recited in claim 9 wherein a minimum series resonance frequency determined by an upper component tolerance of an LLC converter selected from a group of LLC converters that corresponds to a lower end of a target frequency window of LLC operating frequencies.

14. The method as recited in claim 9 wherein a maximum series resonance frequency determined by a lower component tolerance of an LLC converter selected from a group of LLC converters that corresponds to an upper end of a target frequency window of LLC operating frequencies.

15. The method as recited in claim 9 wherein a minimum value of the controlled intermediate DC voltage based on a predetermined tolerance distribution histogram of sample LLC converters provides a maximum series resonant frequency of the LLC converter.

16. The method as recited in claim 15 wherein the predetermined tolerance distribution histogram of sample LLC converters provides a tolerance range for the controlled intermediate DC voltage of about five percent.

* * * * *